US010058816B2

(12) United States Patent
Goldsworthy et al.

(10) Patent No.: US 10,058,816 B2
(45) Date of Patent: Aug. 28, 2018

(54) SOLID DESICCANT COOLING SYSTEM

(71) Applicant: Commonwealth Scientific and Industrial Research Organisation, Campbell (AU)

(72) Inventors: Mark Goldsworthy, Mayfield (AU); Stephen White, Mayfield (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 140 days.

(21) Appl. No.: 14/917,507

(22) PCT Filed: Sep. 9, 2014

(86) PCT No.: PCT/AU2014/000883

§ 371 (c)(1),
(2) Date: Mar. 8, 2016

(87) PCT Pub. No.: WO2015/031948

PCT Pub. Date: Mar. 12, 2015

(65) Prior Publication Data

US 2016/0214055 A1 Jul. 28, 2016

(30) Foreign Application Priority Data

Sep. 9, 2013 (AU) ................................ 2013903446

(51) Int. Cl.
*B01D 53/06* (2006.01)
*B01D 53/26* (2006.01)
(Continued)

(52) U.S. Cl.
CPC ........... *B01D 53/261* (2013.01); *B01D 53/06* (2013.01); *B01J 20/103* (2013.01); *B01J 20/18* (2013.01);
(Continued)

(58) Field of Classification Search
CPC .. B01D 53/06; B01D 53/261; B01D 2257/80; B01D 2259/40086; B01D 2259/4009;
(Continued)

(56) References Cited

U.S. PATENT DOCUMENTS 4,176,523 A * 12/1979 Rousseau ............... B01D 53/02
165/7
4,574,872 A * 3/1986 Yano ....................... F24F 3/147
165/10

(Continued)

FOREIGN PATENT DOCUMENTS

JP 51-77581 A 7/1976
WO 00/074819 A1 12/2000

(Continued)

OTHER PUBLICATIONS

Narayanan, R., et al., "A non-adiabatic desiccant wheel: Modeling and experimental validation," Appl. Therm. Eng., 2013, v. 61, pp. 178-185.

(Continued)

*Primary Examiner* — Frank Lawrence
(74) *Attorney, Agent, or Firm* — Nutter McClennen & Fish LLP; John J. Penny, Jr.

(57) ABSTRACT

A solid desiccant cooling system and method of operating a solid desiccant cooling cycle is provided comprising a desiccant support structure for cyclic movement of solid desiccant between a first location where a solid desiccant contacts a source of air to be dehumidified and a second location with a solid desiccant is regenerated. A heat exchange arrangement is provided preferably at the first location. The heat exchange arrangement provides a heat exchange or thermal engagement of a heat exchange fluid e.g. water, with the desiccant containing tubes. The proposed method and apparatus cools the desiccant while dehumidification of air is conducted. Preferably, the heat exchange
(Continued)

fluid is provided to the desiccant support structure at a position at or adjacent its longitudinal axis, to flow radially therefrom.

20 Claims, 10 Drawing Sheets

(51) Int. Cl.

| | |
|---|---|
| ***F24F 3/14*** | (2006.01) |
| ***B01J 20/18*** | (2006.01) |
| ***B01J 20/26*** | (2006.01) |
| ***B01J 20/28*** | (2006.01) |
| ***B01J 20/34*** | (2006.01) |
| ***B01J 20/10*** | (2006.01) |

(52) U.S. Cl.
CPC ......... *B01J 20/26* (2013.01); *B01J 20/28097* (2013.01); *B01J 20/3408* (2013.01); *B01J 20/3425* (2013.01); *B01J 20/3433* (2013.01); *B01J 20/3458* (2013.01); *B01J 20/3483* (2013.01); *F24F 3/1423* (2013.01); *B01D 2257/80* (2013.01); *B01D 2259/4009* (2013.01); *B01D 2259/40086* (2013.01); *F24F 2003/1458* (2013.01); *F24F 2203/1032* (2013.01)

(58) Field of Classification Search
CPC . B01J 20/103; B01J 20/18; B01J 20/26; B01J 20/3408; B01J 20/28097; B01J 20/3425; B01J 20/3433; B01J 20/3458; B01J 20/3483; F24F 3/1423; F24F 2003/1458; F24F 2203/1032
USPC ............ 95/113–115, 123, 125; 96/125, 126; 62/94, 271, 480; 34/80, 472, 473
See application file for complete search history.

(56) References Cited

U.S. PATENT DOCUMENTS

| | | | | |
|---|---|---|---|---|
| 4,778,492 | A * | 10/1988 | Dawson | B01D 53/0438 95/113 |
| 4,805,317 | A * | 2/1989 | Inglis | B01D 53/261 34/259 |
| 5,509,275 | A * | 4/1996 | Bhatti | B60H 3/024 165/7 |
| 5,878,590 | A * | 3/1999 | Kadle | B60H 3/024 165/165 |
| 6,478,855 | B1 * | 11/2002 | Okano | F24F 3/1411 95/113 |
| 2010/0077783 | A1 * | 4/2010 | Bhatti | F24F 3/1423 62/271 |
| 2012/0152116 | A1 * | 6/2012 | Barclay | B01D 53/06 95/113 |

FOREIGN PATENT DOCUMENTS

| | | | |
|---|---|---|---|
| WO | 2012/162760 | A1 | 12/2012 |
| WO | 2014/085860 | A1 | 6/2014 |

OTHER PUBLICATIONS

International Search Report for Application No. PCT/AU2014/000883, dated Dec. 8, 2014 (3 pages).

Kodama, A, et al., "Performance of a Multipass Honeycomb Adsorber Regenerated by a Direct Hot Water Heating," Adsorption, 2005, v. 11, pp. 603-608.

* cited by examiner

SOLID DESICCANT COOLING SYSTEM

Priority is claimed under 35 U.S.C. § 119 to Australian Application No. 2013903446 filed on Sep. 9, 2013 and under 35 U.S.C. § 365 to PCT/AU2014/000883 filed on Sep. 9, 2014.

FIELD OF THE INVENTION

This invention relates generally to solid desiccant cooling systems of the kind in which a mass of solid desiccant is cyclically moved between an active position in which it dehumidifies an airflow and a regeneration position in which hot air, typically air is employed to evaporate the moisture from the desiccant.

BACKGROUND

Desiccant wheels are used primarily for drying air in industrial or commercial applications specifically where low humidity is required. Since dry air is the key requirement, large wheels are combined with substantial high temperature regeneration heating to obtain very dry, warm air which may or may not be cooled by other equipment downstream. However, for application to building air-conditioning, both drying and cooling of air are important, and energy efficiency is paramount. Where a process air stream is dried in a desiccant wheel it also undergoes heating due to both the exothermic adsorption process and the carry-over of heat from the regeneration side of the wheel via the wheel thermal mass. This heating limits both the amount of dehumidification that can be achieved, and also makes the exiting process air hotter thus limiting the minimum temperature which can be achieved even after subsequent evaporative cooling.

This has led researchers to propose multi-wheel intercooled desiccant cycles [Desiccant properties and their affect on cooling system performance. Collier, R. 1989, ASHRAE Transactions, Vol. 1, pp. 823-827.], multi-stage intercooled cycles [Technical development of rotary desiccant dehumidification and air conditioning: a review La, D., et al. 2010, Renewable and Sustainable Energy Reviews, Vol. 14, pp. 130-147.] and a wheel allowing integrated cooling [Double-stage dehumidification in a two-rotor desiccant cooling process equipped with a multi-divided adsorbent rotor. Kodama, A., et al. 12, Japan: Japan Society of Chemical Engineers, 2009, Journal of Chemical Engineering of Japan, Vol. 42, pp. 930-936.]. However, in the case of solid desiccant wheels, incorporating process air cooling in the rotating desiccant matrix naturally leads to a more complicated design than when a batch process is used and demonstration of improved performance is yet to be achieved. In "Performance of a multipass honeycomb adsorber regenerated by a direct hot water heating. Kodama, A., et al. s.l.: Springer, 2005, Adsorption, Vol. 11, pp. 603-608" the authors have developed a multipass cross-flow desiccant wheel design incorporating process air cooling via a cooling air flow in separate channels as well as regeneration side heating with additional hot water channels. In their design, cooling air flows along the axial direction and the process and regeneration air streams flow into and out of the wheel in a direction perpendicular to the wheel axis. However, the authors found that the performance of the wheel was less than expected due to the high heat capacity of the wheel structure.

An internally cooled wheel design based on a parallel plate type arrangement has been proposed by Narayanan, R., Saman, W., & White, S. (2013). A non-adiabatic desiccant wheel: modelling and experimental validation. *Applied Thermal Engineering*, (61), 178-185.). In their design, cooling air enters in the axial direction through the wheel hub and exits the wheel in alternate channels perpendicular to the axis. Although this wheel was not constructed, testing results in a single channel suggest a significant increase in dehumidification performance when cooling was activated.

Despite the increase in dehumidification performance there is still scope for further improvements to desiccant wheel design and operation.

Any discussion of the prior art throughout the specification should in no way be considered as an admission that such prior art is widely known or forms part of common general knowledge in the field.

It is an object of the present invention to overcome or ameliorate at least one of the disadvantages of the prior art, or to provide a useful alternative.

SUMMARY OF THE INVENTION

In a first aspect, the present invention provides a solid desiccant cooling system, comprising:

- a desiccant support structure adapted for cyclic movement of solid desiccant between a first location where solid desiccant contacts a source of air to be dehumidified and a second location where the solid desiccant is regenerated,
- and a heat exchange arrangement comprising a heat exchange fluid inlet, a heat exchange fluid outlet, and at least one passageway there between such that:
  - a heat exchange fluid flowing in said passageway is adapted to thermally engage said desiccant while remaining fluidly isolated therefrom.

While the aspects of the invention will be described with reference to a heat exchange fluid, the preferred heat exchange fluid is a liquid and most preferably water, but ethanol or glycol could be used.

In another aspect of the invention provides a solid desiccant cooling system comprising

- a desiccant containing structure mounted for cyclic movement about a longitudinal axis of desiccant between a first location where solid desiccant contacts a source of air to be dehumidified and a second location where the solid desiccant is regenerated, the desiccant containing structure comprising
- a plurality of air flow passageways substantially parallel to the longitudinal axis containing desiccant moving between the first location in which the solid desiccant lies in a pathway of air to be dehumidified and a second location in which the desiccant is generated; and
- heat exchange arrangement comprising
  - a heat exchange fluid inlet
  - a heat exchange fluid outlet, and
- at least one heat exchange fluid passageway directing heat exchange fluid from the inlet radially, passed the air flow passageway, the heat exchange fluid passageways being arranged in heat exchange relationship with and separate to the air flow passageways.

Preferably, the heating exchanger arrangement is provided at least the first location. In a further embodiment, the desiccant support structure has a plurality of airflow passageways containing desiccant. The heat exchange passageways are arranged such that the heat exchange fluid is in a thermal engagement with but fluidly isolated from the airflow passageways in the first position. The first location is preferably below the second location and the heat exchange fluid flows from the inlet, over the airflow passageways to the outlet.

In a preferred form, the airflow passageways extend in a substantially mutual parallel array relative to a longitudinal axis of the desiccant support structure.

The structure may have a cylindrical configuration mounted for rotation about the longitudinal axis and preferably has a cylindrical shell. The longitudinal axis is preferably substantially horizontal. The airflow passageways are preferably compartments or conduits disposed radially from the longitudinal axis. The heat exchange fluid inlet to the structure is preferably at or adjacent the desiccant support longitudinal axis about which the desiccant support structure rotates or oscillates The heat exchange fluid outlet may be positioned radially outward of the heat exchange fluid inlet such that the heat exchange fluid flows radially outward from inlet to the outlet.

The desiccant support structure is connectible to ducting to supply air to be dehumidified to the air flow passageways and remove dehumidified air. The inlet of the heat exchange passageways may also be connectible to a supply of heat exchange fluid such as water.

In one preferred embodiment, the airflow passageways are compartments conduits containing the solid desiccant and arranged in a substantially mutual parallel array relative to the longitudinal axis. The heat exchange passageways pass on the outside of the conduits to remain in thermal contact with but fluidly isolated from the desiccant within the conduits. The structure may be provided with at least one radial baffle forming part of the heat exchange passageway. The at least one radial baffle providing a heat exchange fluid passageway directs heat exchange fluid over the conduits from the inlet and back to the outlet of the structure. Preferably at least two radial baffles are provided, defining a heat exchange passageway which produces two or more passes of heat exchange fluid over the conduits between the inlet and outlet. In another embodiment the outlet may also be on the longitudinal axis, ideally at the opposite end of the longitudinal axis from the inlet.

In another preferred form, the compartments extend radially from the longitudinal axis separated by heat exchange passageways.

The heat exchange passageways preferably extend along at least a part of the longitudinal axis in the structure.

The invention also provides, in a further aspect a method of operating a solid desiccant cooling cycle, comprising cyclically moving a mass of solid desiccant between a first location, in which the solid desiccant contacts a flow of air to dehumidify that air by adsorption of moisture to the desiccant, and a second location out of contact with said flow of air, whereby at said first location said solid desiccant is fluidly isolated but thermally engaged by a heat exchange fluid to cool said solid desiccant.

The method also preferably includes a step of regenerating the solid desiccant in the second location; the second location including a flow of a heated air to contact the desiccant.

In one embodiment, the cooling step is carried out in heat exchange passages through which for heat exchange fluid passes through the solid desiccant in heat exchange communication with the desiccant; the cooling fluid preferably being water. In the cooling step, advantage may be taken of gravity by having the flow of the heat exchange fluid generally downwardly in the dehumidifying or first location of the desiccant support structure.

In an alternative embodiment, the heat exchange fluid moves under the effect of gravity and cyclic movement of the desiccant support structure.

The method is preferably performed using a solid desiccant cooling system as described in anyone of the aforementioned embodiments.

In another aspect, the invention may provide a solid desiccant cooling system comprising

- a desiccant containing structure mounted for cyclic movement about a longitudinal axis of desiccant between a first location where solid desiccant contacts a source of air to be dehumidified and a second location where the solid desiccant is regenerated, the desiccant containing structure comprising
  - a plurality of air flow passageways containing desiccant moving between the first location in which the solid desiccant lies in a pathway of air to be dehumidified and a second location in which the desiccant is generated; and
  - heat exchange arrangement comprising
    - a central heat exchange fluid inlet,
    - a heat exchange fluid outlet, and
    - at least one heat exchange fluid passageway from the inlet being arranged in heat exchange relationship with and separate to the air flow passageways, the heat exchange fluid passageway comprising
  - at least one radial baffle forming part of the heat exchange passageway.

The invention may also provide a solid desiccant cooling system comprising

- a desiccant wheel mounted for cyclic movement about a longitudinal axis of desiccant between a first location where solid desiccant contacts a source of air to be dehumidified and a second location where the solid desiccant is regenerated, the desiccant wheel comprising
  - a plurality of air flow passageways containing desiccant oriented substantially parallel to the longitudinal axis moving between the first location in which the solid desiccant lies in a pathway of air to be dehumidified and a second location in which the desiccant is generated; and
  - heat exchange arrangement comprising
    - a central heat exchange fluid inlet,
    - a heat exchange fluid outlet, and
    - at least one heat exchange fluid passageway from the inlet being arranged in heat exchange relationship with and separate to the air flow passageways, the heat exchange fluid passageway comprising
      - at least one radial baffle forming part of the heat exchange passageway.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

BRIEF DESCRIPTION OF THE DRAWINGS

The invention will now be further described by way of example only by reference to the accompanying drawings, in which.

DETAILED DESCRIPTION OF THE EMBODIMENTS

The below described method and apparatus provide a mechanism for improving the performance of a desiccant wheel and in particular improve the dehumidification performance by cooling the desiccant.

Figure 1:
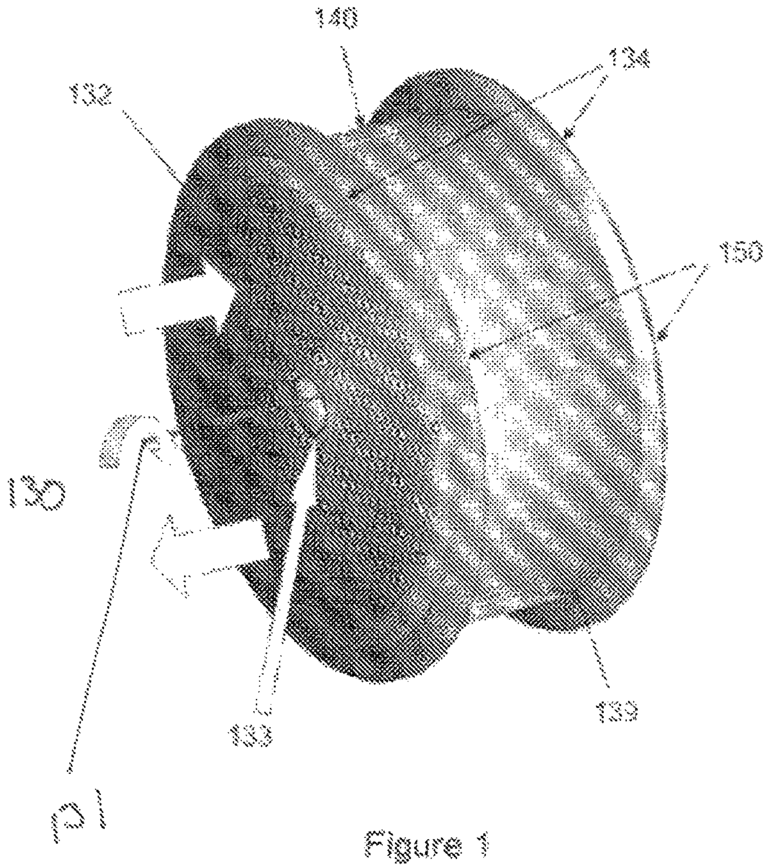
FIG. 1 is a 3-D image of the desiccant wheel according to a first embodiment of the invention showing key parts.

A typical desiccant support structure, in this case a desiccant wheel is shown in FIG. 1. The desiccant wheel 130 is not dissimilar to a rotating shell and tube heat exchanger. Multiple tubes 132 extend in a substantially mutual parallel array between spaced apart end discs 134. These tubes 132 are packed with a desiccant material. The arrangement rotates about longitudinal axis 131 with hollow central shaft 133 passing therethrough. Drive plates 150 can assist in rotation of the desiccant wheel 130.

A skilled addressee will be aware of the types of desiccant suitable for use with the device and method including silica gel, zeolite and polymer desiccant material.

The desiccant wheel shown in FIG. 1 also includes a circumferential wall or shell 139 with drainage holes or apertures 140 therethrough will be discussed below.

Figure 2:
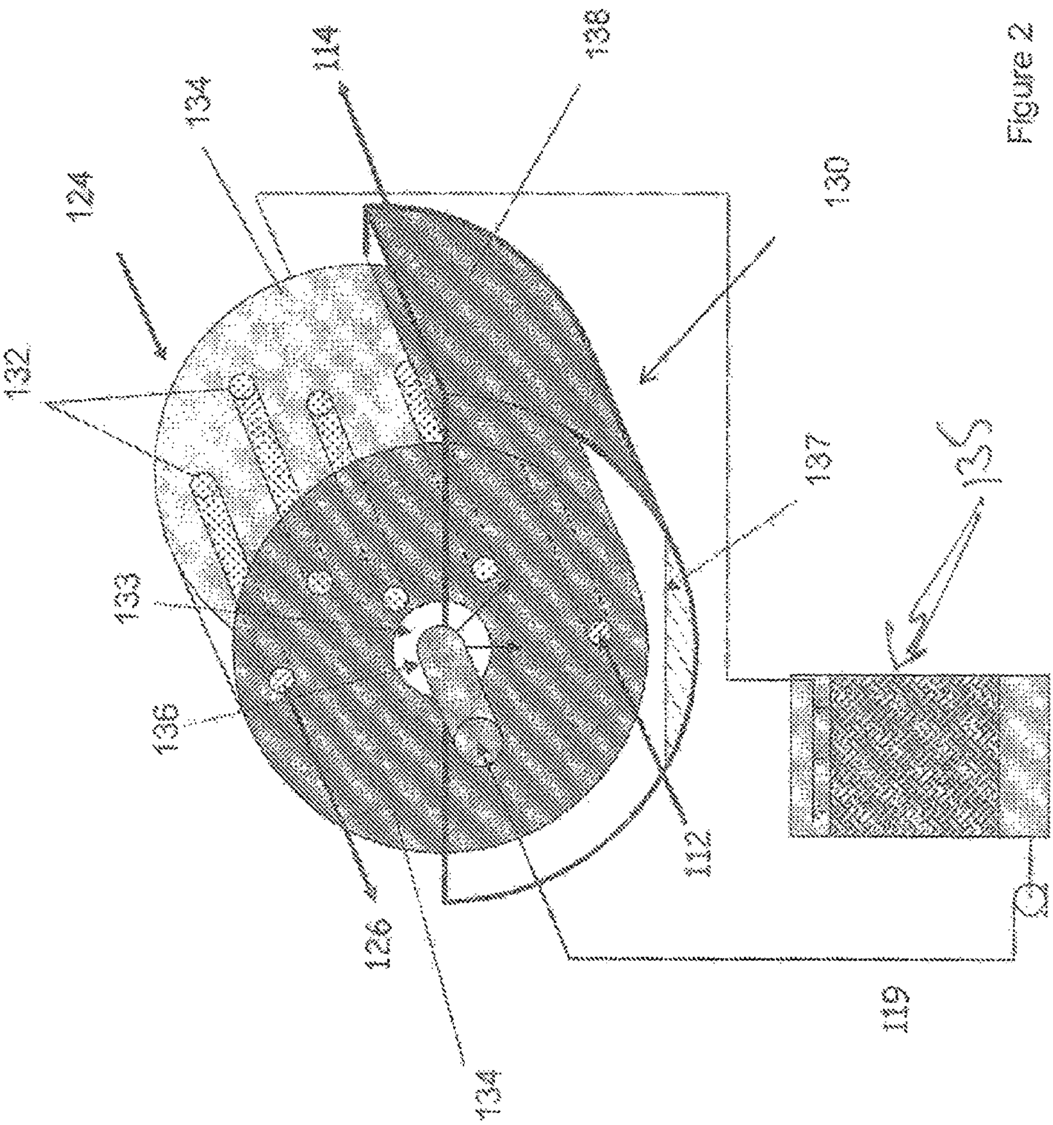
FIG. 2 is a schematic end view of a desiccant cooling system configuration in accordance with a first embodiment of the invention.

Operation of the wheel is shown in FIG. 2. As the desiccant wheel 130 is rotated, each desiccant filled tube 132 is cycled between a first location where solid desiccant contacts a source of air to be dehumidified and the second location where the solid desiccant is regenerated. This first dehumidification location is generally below the second regeneration location, as shown more clearly in FIG. 2.

In the embodiment shown in FIG. 2, the lower half of the desiccant wheel 130 defines a first or dehumidification location. In this first location, process air stream 112 is supplied to the desiccant filled tubes 132 in the lower half. The thus supplied process air stream 112 is dehumidified as it passes down the inside of the tubes, contacting the desiccant material. This all occurs in the first location, i.e. lower half/orbit of the tubes. The resulting dehumidified air stream 114 exits and used as appropriate.

The upper half of the desiccant wheel 130 defines the second or regenerative location. A regenerative stream, preferably hot air 124, is passed into desiccant filled tubes 132 to regenerate the desiccant. Outlet stream 126 which exits the tubes 132 which will have a higher moisture content than inlet stream 124. This regeneration step dries and essentially "refreshes" the desiccant ready to receive further process air 112 as it passes back into the lower half or first "dehumidification" location.

As mentioned above, there have been various techniques proposed to cool the desiccant following application of the hot regenerative air stream 124. The applicants, however, have recognised that incorporating internal cooling in the desiccant wheel 130 itself leads to increased performance gains.

A configuration effective to cool the desiccant as it adsorbs moisture from a process air stream 112 is illustrated in FIG. 2. In this configuration, a cooling fluid is used to cool the desiccant material as it dehumidifies process the supply air 112 again at the first location. The physical requirements of the cooling fluid is that it is more dense that the fluid in the spaces around the desiccant tubes 132. This enables the fluid to flow into and through the desiccant structure under the influence of gravity. The most practical fluid to cool the desiccant material as it dehumidifies the supply air is water. However, in certain circumstances, other cooling fluids may be used, e.g. ethanol or glycol.

The desiccant wheel shown in the embodiment of FIGS. 1 and 2 includes a feed pipe 136 essentially coaxial with the longitudinal axis of rotation of the desiccant wheel 130. Indeed in embodiments this pipe 136 can be the axle about which the desiccant wheel 130 rotates. The pipe 136 can be mounted in hollow shaft 133 which is fixed to and rotates with the wheel 130.

A cooling tower 135 provides cooling water 119 to pipe 136 in shaft 133. The pipe 136 and shaft 133 have a number of radial apertures to allow the water to escape and, under gravity, pass downwardly through the desiccant wheel 130, and subsequently through apertures 140 in the circumferential wall 139 and into reservoir 138 in which the desiccant wheel sits. The level of cooling fluid e.g. water 137 in the reservoir 138 can be controlled by a suitable weir, float or other control arrangement. It is preferred that the level of fluid 137 in the reservoir is maintained at such height that all desiccant tubes 132 passing through the first location are completely immersed in the cooling liquid.

As the desiccant wheel 130 rotates, the tubes 132 are contacted by falling cooling liquid and also plunged into the cooling bath or reservoir 138 to be cooled. This enhances the dehumidification process as previously described. As the wheel 130 continues to rotate, the tubes 132 come out of the cooling bath and enter into the regeneration zone, where as discussed above, hot air 124 passes through the tubes 132 to regenerate the desiccant material by evaporating the moisture adsorbed thereto.

Accordingly it can be seen that each desiccant tube cycles through a first location where the air passing through the tube is dehumidified as well as the tube itself being cooled, and then to a second location wherein the desiccant is regenerated.

It will be clear to a person skilled in the art that the desiccant is fluidly isolated from the heat exchange fluid within the wheel. However, contact of the heat exchange fluid with the desiccant tubes provides a thermal exchange i.e. cooling of the tubes, and hence the desiccant contained therein. This innovative approach provides both a compact and reliable construction as well as improved performance over conventional desiccant cooling systems as will be discussed below.

Figure 3:
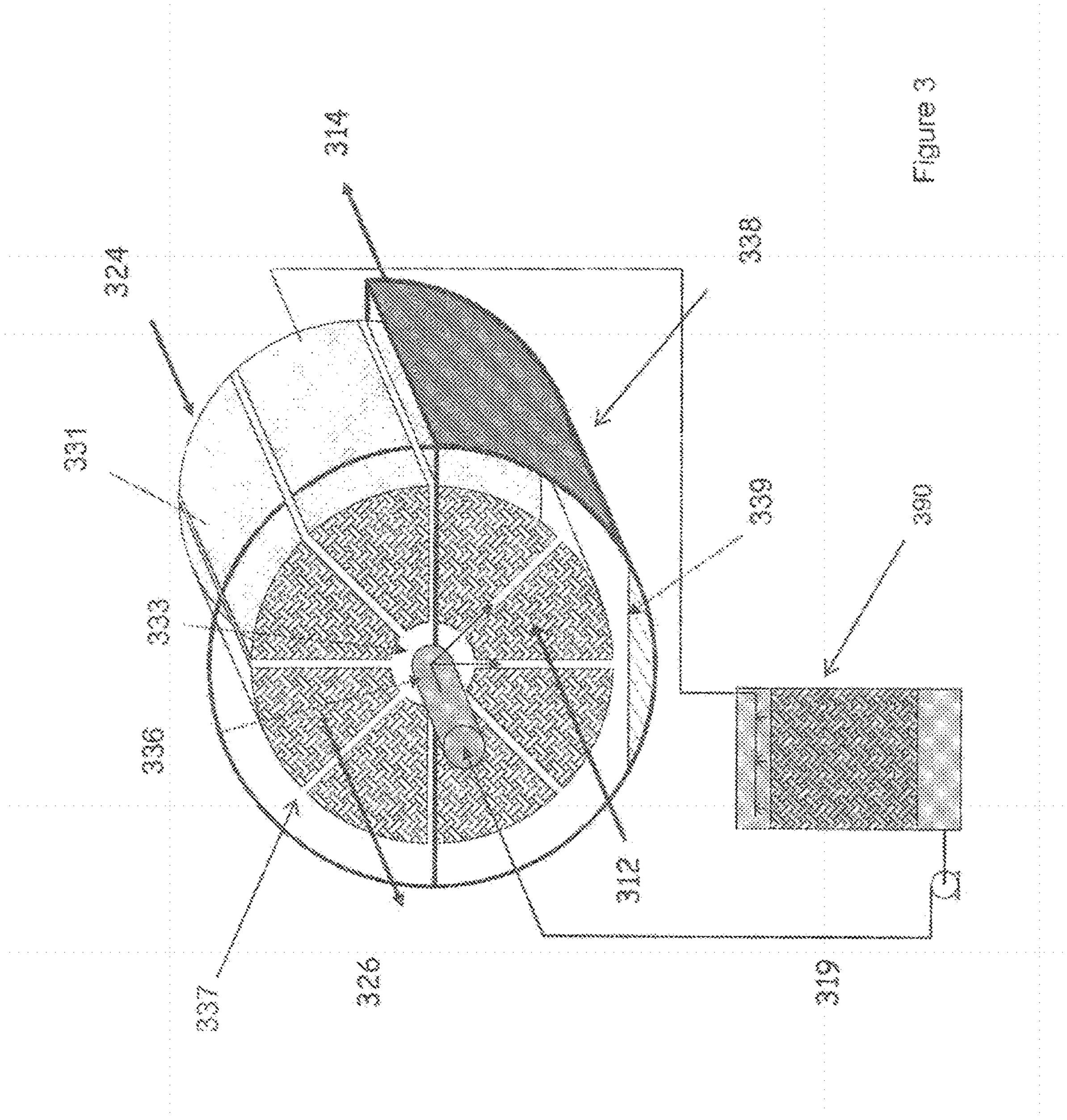
FIG. 3 is a schematic end view of a desiccant wheel configuration in accordance with a second embodiment of the invention.

FIG. 3 shows a further embodiment of the invention. In this embodiment, the desiccant wheel is provided with a desiccant matrix 331 rather than individual desiccant tubes 132. The operation of the device shown in FIG. 3, however, is similar to that shown in FIG. 2 in that the desiccant wheel cycles through the first location where air is dehumidified and the desiccant matrix is cooled, and a second location in which the desiccant matrix is regenerated.

In the example embodiment of FIG. 3, cooling water 319 is used to cool a desiccant matrix 331. Cooling water 319 from a cooling tower 390 is fed into a central channel 333 in the desiccant wheel 330, via the shaft 336. Water then falls under gravity through radial channels 337 in the desiccant matrix 331. The radial channels 337 act as a heat transfer surface for removing the heat of adsorption from the desiccant matrix 331. Water 319, radially exiting the desiccant wheel 331, is collected in a reservoir 338 and passed back to the cooling tower 335.

As with the embodiment shown in FIG. 2, a suitable level of cooling liquid 339 is maintained within reservoir 338. As the desiccant matrix rotates through the reservoir, the desiccant matrix 331 is cooled. Water will drain back out of the channels 333 and 337 as they rotate into the second regeneration location, thereby eliminating undesirable cooling of the desiccant matrix in the regeneration section.

Figure 4:
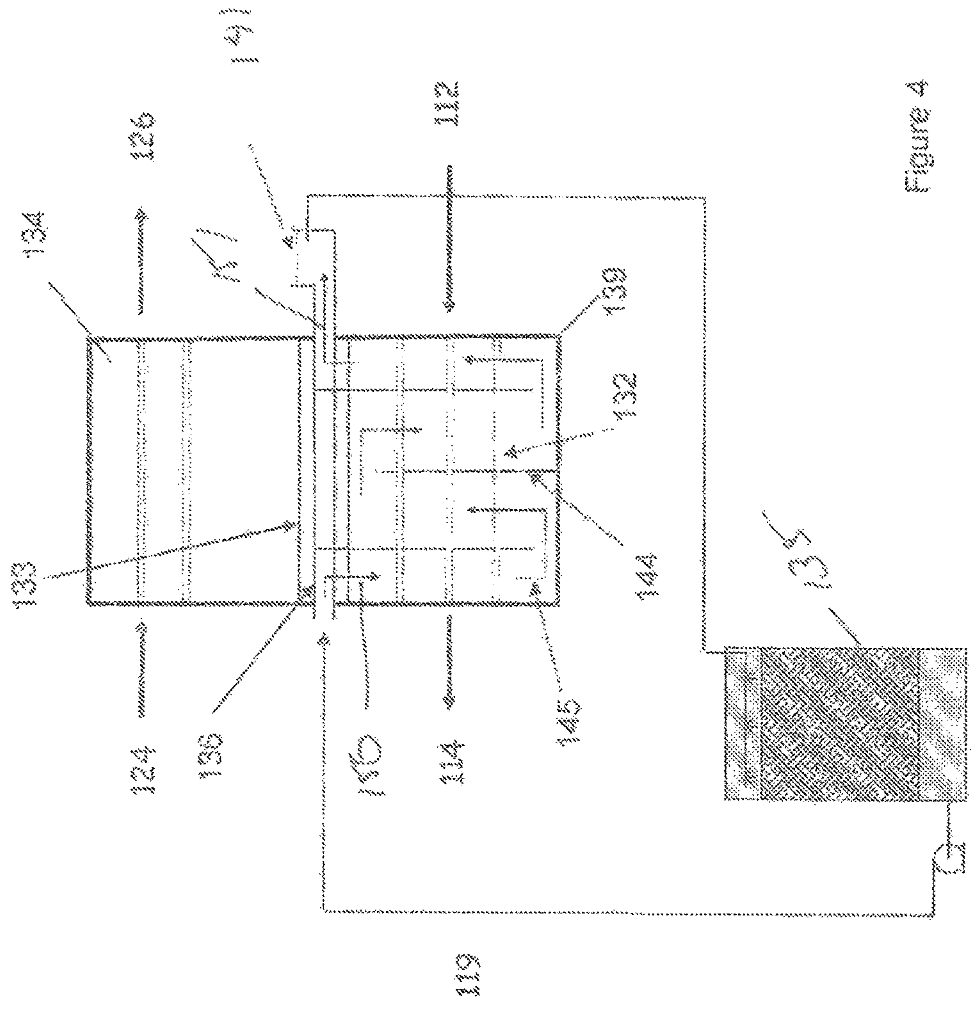
FIG. 4 is a schematic view showing a sectional representation of the third embodiment of the invention.

A further embodiment of the device is shown in FIG. 4. In FIG. 4, cooling water 119 enters the central stationary shaft 136 of the desiccant wheel 130. The embodiment shown in FIG. 4 does not necessarily require the reservoir as shown in FIGS. 2 and 3. Rather, the desiccant wheel may be sealed to allow passage of the cooling water 119 to remain entirely within the wheel. The central shaft 136 is mounted to the wheel via an outer rotating shaft in the form of an axle housing 133 which is fixed relative to the rest of the desiccant wheel structure. The central shaft 136 is mounted in the axle housing 133 via bearings allowing relative rotational movement between the wheel and the shaft 136.

As with the embodiments shown in FIGS. 2 and 3, in the lower half of the desiccant wheel rotation i.e. first location, air to be dehumidified 112 is provided to the desiccant tubes 132, passes through the tubes thereby contacting the desiccant, and exits as dehumidified air stream 114.

In an upper half of the desiccant wheel's rotation i.e. second location, a hot air regeneration stream 124 is provided to the desiccant tubes 132 to refresh the desiccant therein, resulting in a relatively moist regeneration air exit stream 126.

Unlike the embodiment shown in the desiccant wheel of FIGS. 2 and 3, however, FIG. 4 has a sealed outer circumferential wall 139 extending between face plates 134.

The axle housing 133 and central shaft 136 are provided with radial apertures which can provide a fluid inlet 150 and outlet 151 for the cooling liquid into and out of the desiccant wheel. Suitable seals are provided to prevent leakage of the cooling liquid. The cooling liquid 119 flows into the shaft 136, through inlet 150, and then flows primarily under gravity downwardly towards the lower outer circumferential wall 139 of the desiccant wheel 130. The cooling liquid 119 passes through heat exchange passageways among and in contact with the desiccant tubes 132 mounted in the wheel structure. The tubes 132, as discussed above, are generally arranged in a substantially mutually parallel array relative to the longitudinal rotational axis of the wheel. Preferably the lower region of the desiccant wheel is filled with cooling liquid 119 or at least filled to a level which ensures all desiccant tubes 132 are immersed in the cooling liquid 119 during their passage through the first location.

Cooling liquid may also exit the first location via the central shaft 136. The outlet 151 for the heating liquid may also be provided on the shaft 136. A cooling liquid reservoir 141 may be provided to ensure the level of cooling liquid, e.g. water in the desiccant wheel is maintained.

Baffles 144 may also be provided within the wheel direct the cooling water in a counter current path 145 to the air 112 to be dehumidified. The baffles may extend radially from the wheel axis and are suitably shaped and positioned so that cooling liquid in the final pass as it approaches the exit is directed back towards the central shaft 136. The structure of the central shaft 136 and the axle housing 133 at the liquid discharge side, i.e. outlet of the desiccant wheel, is similar to the entrance/supply side i.e. inlet, in that apertures in the housing 133 and central shaft 136 provide a fluid passageway to the conduit in the central shaft 136 which is at least hollow for a part of the length at the exit end. This enables the cooling liquid 119 to be removed at the central shaft 136 and optionally passed to the reservoir 141 prior to being returned to the cooling tower 135.

Test Apparatus

Figure 5A:
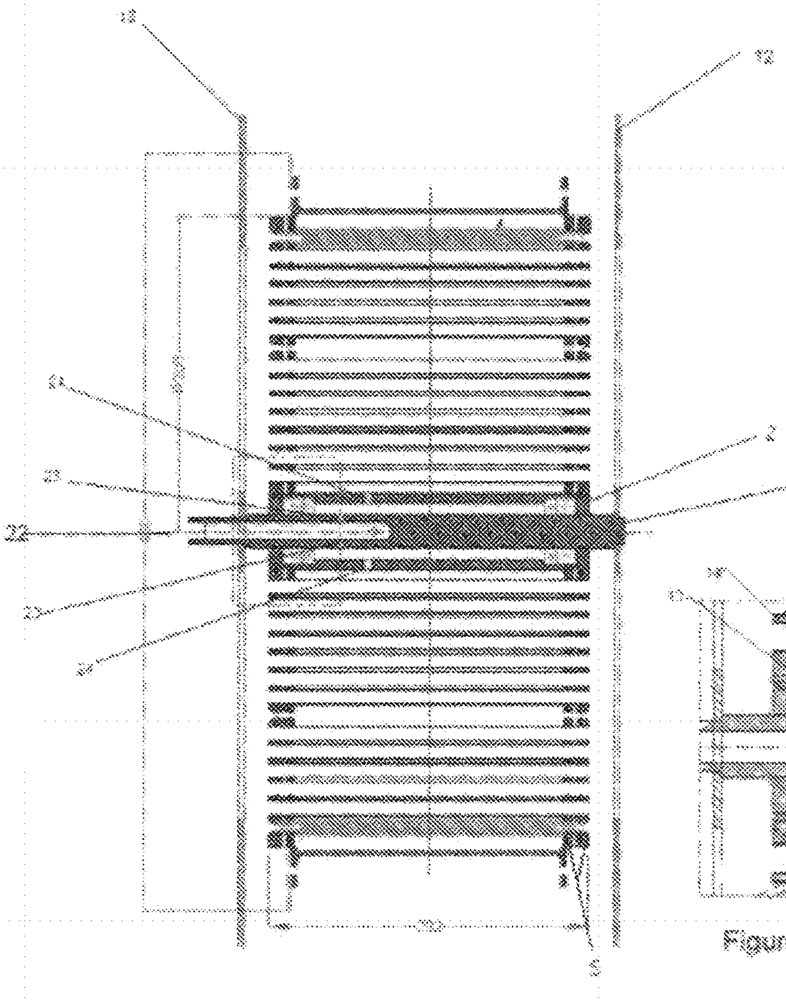
FIGS. 5A and 5B are sectional and detailed views respectively of a fourth embodiment of desiccant wheel structure
Figure 5B:
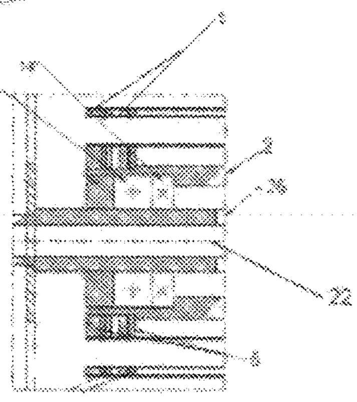

FIGS. 5A and 5B are sectional and detailed views of a test desiccant wheel structure based on a shell and tube heat exchanger housed between circular end plates 5 and housed within an outer casing 12.

As with the embodiments shown in FIGS. 1 to 4, process air to be dehumidified flows through desiccant coated channels inside aluminum tubes in at a first location of the wheel (lower half) and regeneration air flows through the channels at a second location (upper half).

The aluminium tubes of FIGS. 5A and 5B extend through the end plates 12 allowing passage of air through the tubes. The structure is provided with an axle housing 2 (see FIG. 5B) to mount to the central shaft 36 for rotational movement about that shaft. The axle housing 2 is a cylindrical construction having radial apertures 24 providing fluid communication with heat exchange passageways between and around the desiccant tubes. The shaft 36 is mounted in the axle housing with bearings 13 and is hollow at least along a part of its length providing a fluid conduit 22 with radial openings 23. These radial openings 23 cooperate with the radial openings 24 in the axles housing 2 to provide a flow passage for heat exchange liquid e.g. water, ethanol, glycol etc into the heat exchange passageways in the desiccant wheel. Seals 14 are provided to protect the bearing 13 and seal the borders of the flow passage through the axle housing.

The heat exchange fluid enters through the stationary central shaft 36 about which the wheel rotates and then travels around the outside of the tubes in the lower half of the wheel before exiting through holes in the other circumferential shell of the wheel. The heat exchange fluid may be used to either heat the regeneration side or to cool the process air side. In a preferred embodiment water is used as a coolant medium to cool the process air side.

For the purpose of trialling the inventive method and device, the desiccant wheel structure comprise 788 200 mm long tubes with 9.6 mm outer diameter and 8.7 mm inner diameter and centre-to-centre spacing of 11.7 mm are held in place by three separate face plates (with outer diameter of 400 mm) at each end of the wheel. Each end has two rubber sealant gaskets between the plates to prevent coolant water leaking out of the wheel into the air streams. The tubes are packed with a super-adsorbent polymer desiccant material which forms channels of approximately 1.2 mm hydraulic diameter and 0.13 mm half wall thickness inside the tubes. The super adsorbent polymer desiccant material used is that exemplified in Lee, J. and Lee, D. Y (2012) Sorption characteristics of a novel polymeric desiccant Int. J. of Refrigeration V 35, PP1940-1949. Owing to the available desiccant material, the tubes were only filled with the desiccant to a length of 150 mm. The entire assembly is held together with fasteners to allow replacement of the tubes. The total rotating mass of the wheel is approximately 13.3 kg.

Figure 6:
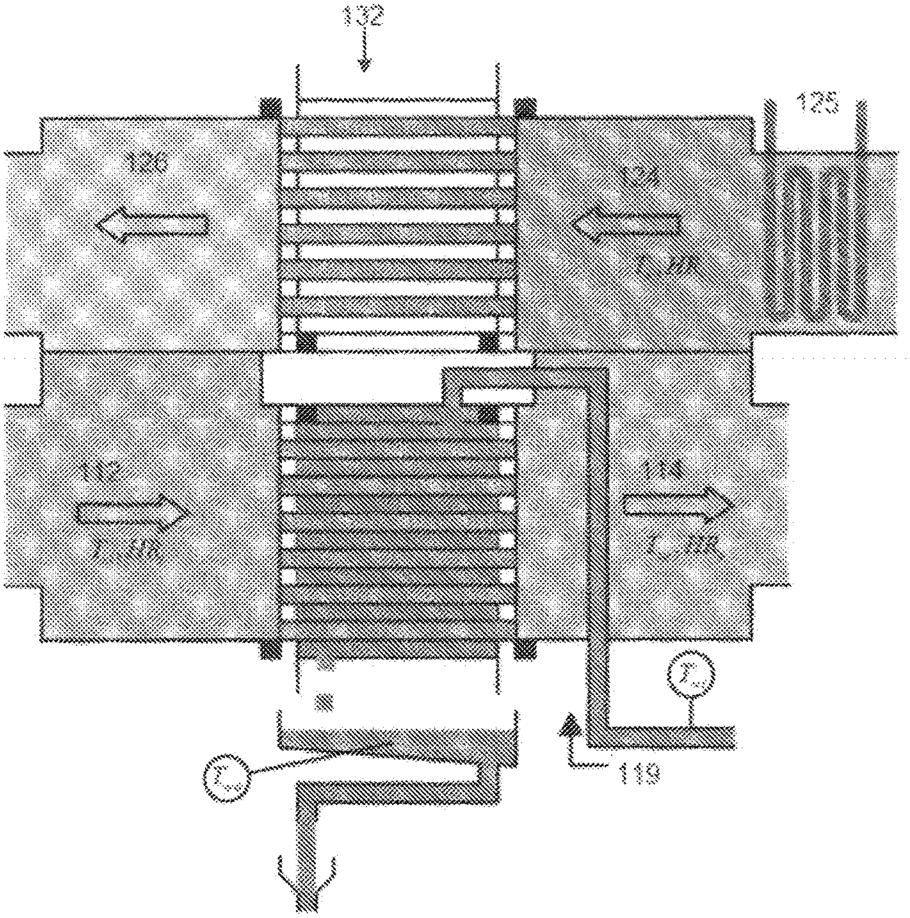
FIG. 6 is a schematic of the operation of the desiccant wheel of FIGS. 5A and 5B showing the cooling water flow-path and key measurement parameters.
Figure 7A:
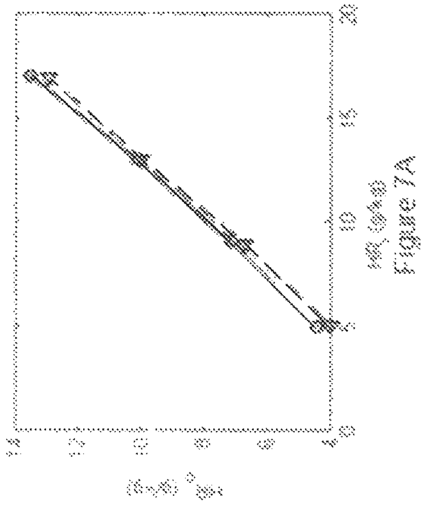
FIGS. 7A-7D is a comparison of $HR_{so}$ with (dashed lines) and without (solid lines) internal cooling. Left side—$T_{si}$=25° C., right side—$T_{si}$=35° C. First and third rows—$T_r$=50° C., second and fourth rows—$T_r$=80° C.
Figure 7B:
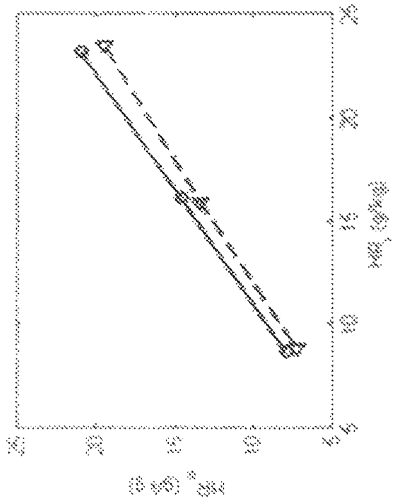
Figure 7C:
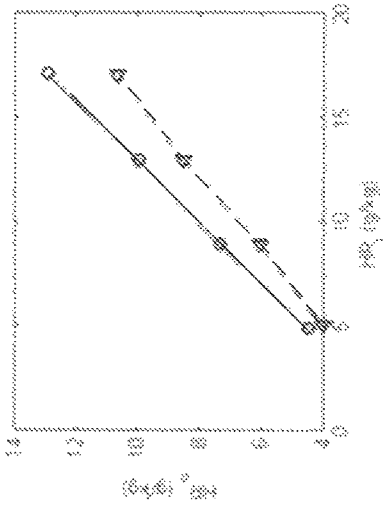
Figure 7D:
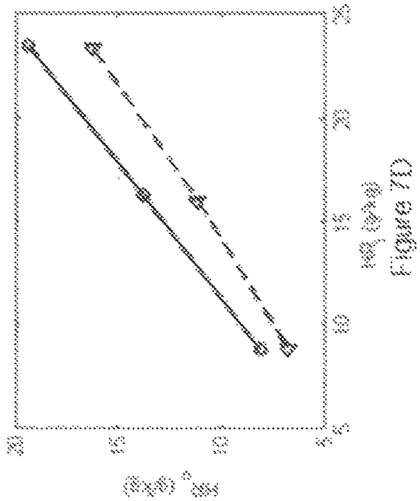
Figure 7E:
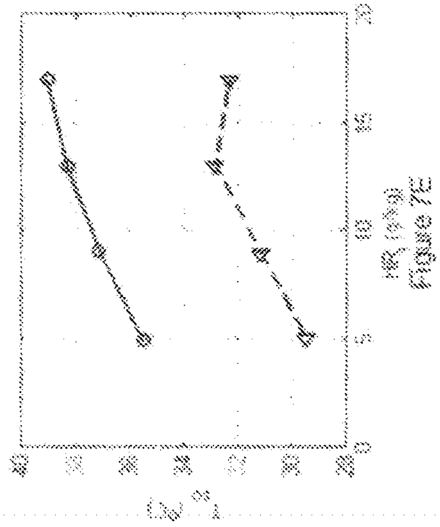
FIGS. 7E-7H is a comparison of $T_{so}$ with (dashed lines) and without (solid lines) internal cooling. Left side—$T_{si}$=25° C., right side—$T_{si}$=35° C. First and third rows—$T_r$=50° C., second and fourth rows—$T_r$=80° C.
Figure 7F:
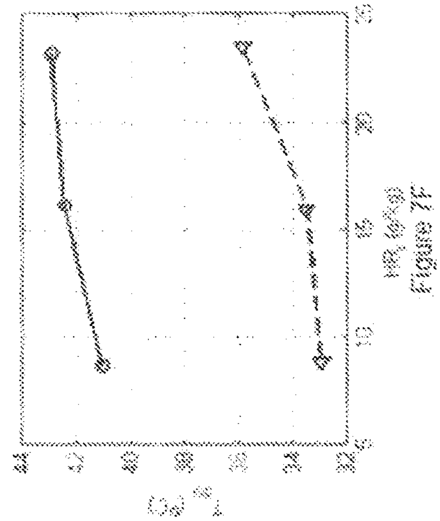
Figure 7G:
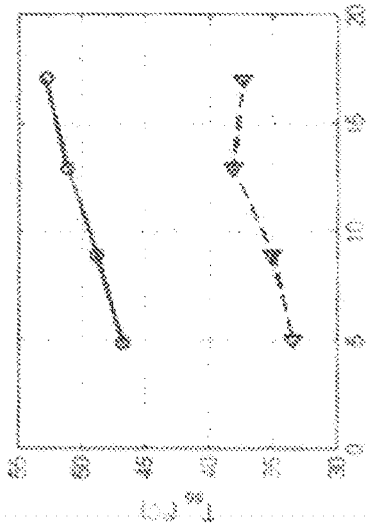
Figure 7H:
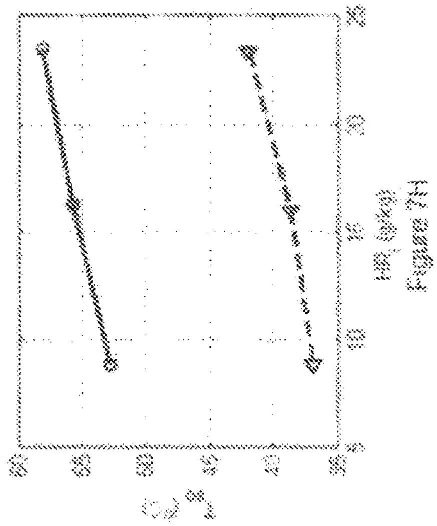

The test device of FIGS. 5A and 5B is shown schematically in FIG. 6.

Experimental testing was performed using the Controlled Climate Test Facility at CSIRO in Australia. This facility is designed to provide two conditioned air-streams at specified temperature and humidity conditions, and to measure the outlet air states and flow-rates. Further details of measurements and equipment used in detailed in "Characterisation of desiccant wheels with alternative materials at low regeneration temperatures". White, S, et al. 8, 2001, International Journal of Refrigeration, Vol. 34, pp. 1786-1791.

Referring to FIG. 6, the cooling liquid i.e. water 119 flowed directly from the mains 120 and the inlet volumetric flow-rate was measured using a Gems Hall effect sensor with pulses counted by an ADAM 4080 counter over a ten second period. The sensor was calibrated by volumetric measurement and indicated errors were less than 2%. The water inlet $T_{wi}$ and outlet $T_{wo}$ temperatures were measured using two class A RTD-sensors (accuracy of ±0.2° C.). The inlet sensor was located in front of the flow meter and the outlet sensor was placed in the bund where the water exiting from the wheel was collected. The inlet temperature was not controlled, though the variation was small (<2° C.) over the tests. Once all the sensor measurement readings were stable for a given set of input conditions, the measurement period was started with points sampled every second for 30 minutes. Results presented are the averages over these 30 minute periods.

As with the previous embodiments, in the first location i.e. lower region a process air 112 is supplied to the desiccant tubes 132 and dehumidified air 114 exits therefrom.

A regeneration air flow 124 is heated by means of the heating coil 125. This regeneration air flow passes through desiccant tubes 132 in the second location i.e. in the upper half of the desiccant rotation. The resultant air flow 126 leaving the regeneration zone is at a higher moisture content since it removes moisture from the desiccant within the tubes 132.

The performance of wheel was measured for process air inlet temperatures $T_{si}$=25,35° C., regeneration air temperatures $T_r$=50,80° C. and equal process and regeneration air inlet absolute humidity ratios $4.9 \le HR_i \le 23.5$ $gkg^{-1}$. The wheel air face velocity was maintained constant at 2.15±0.1 $ms^{-1}$ for all tests. At each combination of air inlet conditions, testing was performed both with and without water cooling. For the tests without water cooling, the wheel was completely drained of all water. The water flow rate was varied for one condition as discussed below, before being fixed for the remainder of the tests at 8.5 L $min^{-1}$. $T_{wi}$ was uncontrolled and varied between 25 and 28° C. between tests.

The process air outlet humidity ratio $HR_o$ and temperature $T_{so}$ are compared as a function of $HR_i$ for each case, both with cooling (dashed lines) and without cooling (solid lines) in FIG. 6. For all cases $HR_o$ and $T_{so}$ are both lower when water cooling was used. For $T_r$=80° C. the water cooling leads to an additional 0.5-3 $gkg^{-1}$ of dehumidification over the cases without water cooling. For $T_r$=50° C., the improvement is less; between 0.2-2 $gkg^{-1}$. The larger the decrease in $T_{so}$ resulting from water cooling, the greater is the increase in dehumidification. Even for $T_{wi}>T_{si}$, the cooling water still has a significant positive impact due the reduction of supply air heating through the wheel.

FIG. 7A-7D is a comparison of $HR_{so}$ with (dashed lines) and without (solid lines) internal cooling. Left side—$T_{si}$=25° C., right side—$T_{si}$=35° C. First and third rows—$T_r$=50° C., second and fourth rows—$T_r$=80° C.

FIGS. 7E-7H are a comparison of is a comparison of $T_{so}$ with (dashed lines) and without (solid lines) internal cooling. Left side—$T_{si}$=25° C., right side—$T_{si}$=35° C. First and third rows—$T_r$=50° C., second and fourth rows—$T_r$=80° C.

Figure 8A:
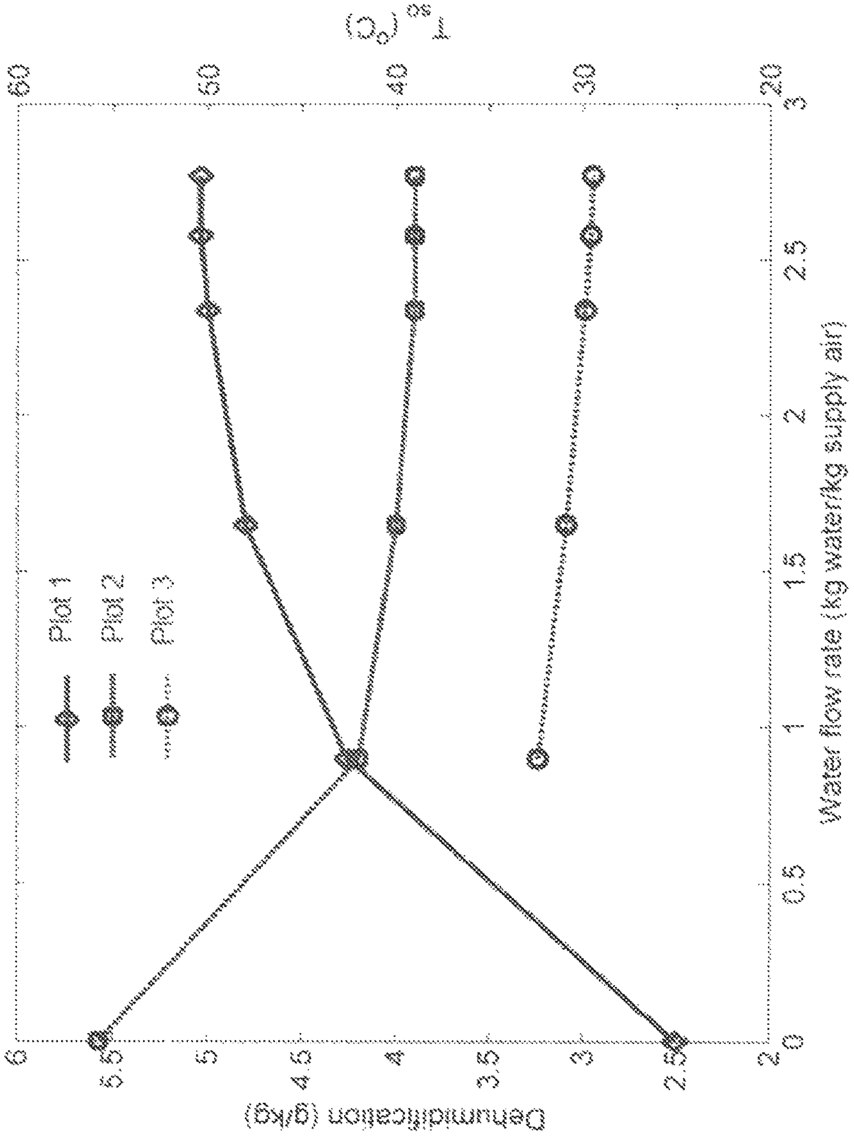
FIG. 8A is a graph of variation of $T_{so}$, $T_{wo}$ and dehumidification with varying cooling water flow rate.

The influence of varying water flow rate was investigated for $T_{si}$=35° C., $T_r$=80° C. and $HR_i$=16 $gkg^{-1}$. The water flow-rate was varied up to 8.5 L $min^{-1}$ (a water mass-flow rate of approximately 2.8 times the supply air flow rate). The variation of dehumidification amount ($HR_i$-$HR_o$), air and water outlet temperature is shown in FIG. 8A which is the variation of $T_{so}$, $T_{wo}$ and dehumidification with varying cooling water flow rate. Plot 1 is the effect on dehumidification. Plot 2 is the effect on air outlet temperature, and plot 3 is the effect on water outlet temperature.

Dehumidification performance increased with increasing cooling water flow rate but appears to approach a limit when higher cooling water flow rate provides no further cooling of the air. For this high flow rate though a significant difference remained between $T_{so}$ and $T_{wo}$ even for high water flow-rates. This is due to the finite time it takes for the inert tubes to cool after exiting the regeneration region. That is, the process air outlet temperature reported here is actually the mean outlet temperature of all of the tubes in the process flow; and the length of time since each tube was in the regeneration region varies from zero to half the wheel rotation time. This temperature difference is likely to decrease as the thermal resistance between the water and the air via the tube wall and internal tube structure decreases.

Figure 8B:
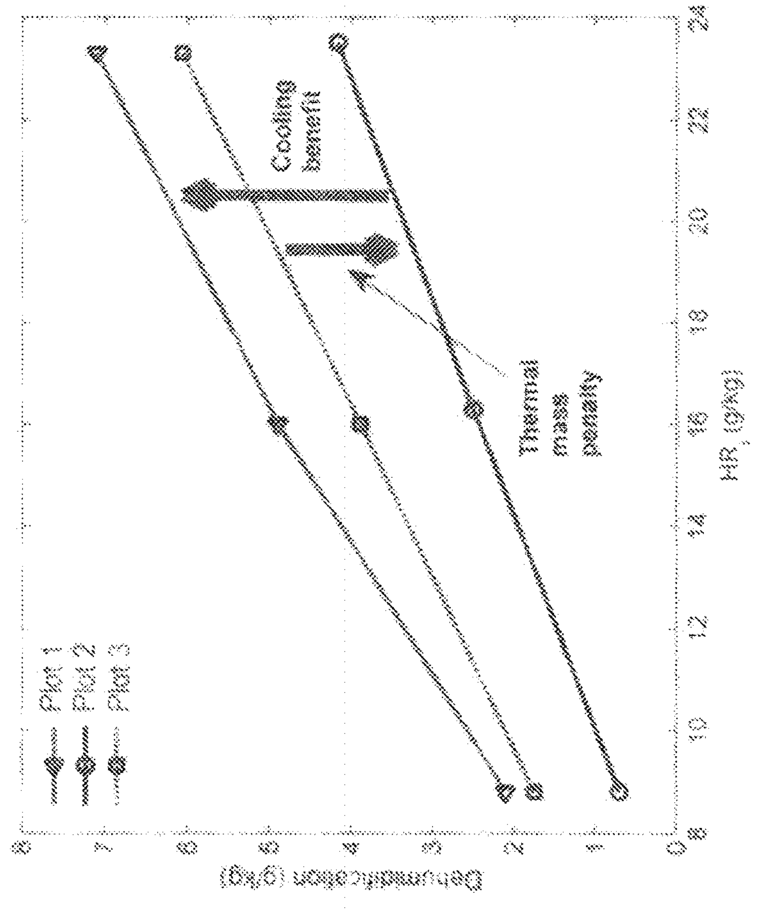
FIG. 8B is a comparison of the heat exchange wheel with (triangles) and without (circles) cooling with a conventional wheel using the same desiccant (squares)

The performance of the internal heat exchange wheel with polymer desiccant inserts was compared with that of a conventional wheel with the same polymer desiccant for $T_{si}$=35° C., $T_r$=80° C. and varying $HR_i$. The results are shown in FIG. 8B. Plot 1 is for a cooled desiccant wheel with internal heat exchange in accordance with the present invention. Plot 2 is for an internal heat exchange wheel with no cooling and plot 3 is for a conventional wheel with the same polymer desiccant. Without cooling, the heat exchange wheel delivers less dehumidification than the conventional wheel but with internal cooling, the dehumidification amount is approximately 1 $gkg^{-1}$ higher. The drop in performance without cooling is most likely due to the higher thermal mass of the heat exchange wheel.

The overall thermal mass of the heat exchange wheel could be readily decreased by replacing the three end plates at each end with single 2 mm thick end plates sealed with glue. This would decrease the total thermal mass by 3.5 kg to approximately 9.8 kg. Increasing the length of the desiccant inserts from 150 mm to the full 200 mm tube length would also greatly increase the desiccant to inert mass fraction and so further improve the dehumidification performance. Finally, the relative performance improvement may be, in fact, higher for other desiccant materials since the particular polymer used is known to result in generally lower process air outlet temperatures than for example, silica gel or zeolite.

The results show significantly improved performance over a conventional wheel when using cooling water supplied at close to the air inlet temperature. With small changes to the design to reduce the total thermal mass and increase the desiccant mass fraction further improvements are likely.

The modular design is simple to manufacture using processes similar to those used to construct shell-tube heat exchangers.

Throughout the specification it should be understood that the term "heat exchange relationship" refers to thermal engagement or heat exchange between fluids. References to the heat exchange fluid being "fluidly isolated" or "separate" the airflow passageway should be understood as defining no contact between the heat exchange fluid and the air passing through the airflow passageway. In other words, a fluid barrier exists between the heat exchange fluid and the air in the airflow passageway but heat or thermal exchange can be affected.

References to the heat exchange fluid inlet "at or in the vicinity of the longitudinal axis" should be considered the same scope of "at or adjacent to the longitudinal axis" and simply refer to the necessary function of the heat exchange fluid being provided to a position near the longitudinal axis of rotation of a desiccant wheel and at least in a position which will not interfere with the normal function of the desiccant wheel.

It will also be understood by persons skilled in the art that modifications and variations may be made to the embodiments shown without departing from the spirit or scope of the invention.

For instance, in another variation of the present invention a solid desiccant cooling system provided comprising;

- a desiccant containing structure mounted for cyclic movement of solid desiccant about a longitudinal axis between a first location where solid desiccant contacts a source of air to be dehumidified and a second location where the solid desiccant is regenerated, the desiccant containing structure comprising
- a plurality of air flow passageways containing desiccant moving between the first location in which the solid desiccant lies in a pathway of air to be dehumidified and the second location in which the desiccant is regenerated; and
- heat exchange arrangement to cool the solid desiccant in the first location comprising
  - a heat exchange fluid inlet at or in the vicinity of the longitudinal axis,
  - a heat exchange fluid outlet, and
  - at least one passageway from the inlet being arranged in heat exchange relationship with and separate to the air flow passageways.

The solid desiccant cooling system of the above embodiment may include the airflow passageways extending substantially parallel to the longitudinal axis through the desiccant containing structure.

In a further embodiment, the invention provides solid desiccant cooling system

- a desiccant containing structure mounted for cyclic movement about a longitudinal axis of desiccant between a first location where solid desiccant contacts a source of air to be dehumidified and a second location where the solid desiccant is regenerated, the desiccant containing structure comprising
- a plurality of air flow passageways substantially parallel to the longitudinal axis containing desiccant moving between the first location in which the solid desiccant lies in a pathway of air to be dehumidified and the a second location in which the desiccant is regenerated; and
- heat exchange arrangement to cool the solid desiccant in the first location comprising
  - a heat exchange fluid inlet
  - a heat exchange fluid outlet, and
  - at least one heat exchange fluid passageway directing heat exchange fluid from the inlet radially, past the air flow passageway, the heat exchange fluid passageways being arranged in heat exchange relationship with and separate to the air flow passageways.

The solid desiccant cooling system of any of the preceding embodiments may include the inlet of the heat exchange passageways being connectible to a supply of heat exchange fluid.

The solid desiccant cooling system of any of the preceding embodiments may include the desiccant containing structure having a cylindrical configuration mounted for rotation about e longitudinal axis.

The solid desiccant cooling system of any of the preceding embodiments may include the longitudinal axis being substantially horizontal.

The solid desiccant cooling system of any of the preceding embodiments may include the airflow passageways as compartments or conduits disposed radially from the longitudinal axis and/or the airflow passageways being conduits containing the desiccant.

The desiccant cooling system of any of the preceding embodiments may include the heat exchange passageways passing on the outside of the conduits in heat exchange relationship with the conduits, the desiccant containing structure being provided with at least one radial baffle forming part of the heat exchange passageway.

The least one radial baffle may border the heat exchange fluid passageway which pass the airway conduits from the inlet and back to the outlet of the structure.

If at least two radial baffles are provided, the heat exchange passageway may provide two or more passes of the conduits between the inlet and outlet.

The desiccant cooling system of any of the preceding embodiments may include the outlet on the longitudinal axis, preferably at the opposite end of the longitudinal axis to the inlet.

The desiccant cooling system of any of the preceding embodiments may include the compartments extending radially from the longitudinal axis separated by heat exchange passageways.

The desiccant cooling system of any of the preceding embodiments may include the heat exchange fluid is a liquid which moves through the heat exchange passageways under the effects of gravity.

Alternatively the heat exchange fluid moves under the effect of gravity and cyclic movement of the structure.

The desiccant cooling system of any of the preceding embodiments may include the heat exchange passageways being arranged for heat exchange fluid to be in a heat exchange relationship when the airflow passageways are in the first position.

The desiccant cooling system of any of the preceding embodiments may include the first position being below the second position and the heat exchange fluid flowing from the inlet, over the airflow passageways to the outlet.

The present invention may also provide a method of operating a solid desiccant cooling cycle, comprising cyclically moving a mass of solid desiccant in a solid desiccant cooling wheel between a first location, in which the solid desiccant lies in a flow of air and dehumidifies that air by adsorption of moisture to the desiccant, and a second location out of said flow of air, cooling the solid desiccant as it adsorbs moisture from the air at said first location with a heat exchange fluid introduced into the solid desiccant cooling wheel.

The method of operating a solid desiccant cooling cycle may also include a further including the step of regenerating the solid desiccant in the second location; the second location being a flow of a heated air.

The aforementioned cooling step may be carried out in heat exchange passages through which heat exchange fluid passes in heat exchange communication with the desiccant.

The fluid preferably flows generally downwardly in the dehumidifying location of the desiccant, in heat exchange communication within the desiccant.

In still a further embodiment, the present invention provides a solid desiccant cooling system comprising a desiccant containing structure mounted for cyclic movement about a longitudinal axis of desiccant between a first location where solid desiccant contacts a source of air to be dehumidified and a second location where the solid desiccant is regenerated, the desiccant containing structure comprising a plurality of air flow passageways containing desiccant moving between the first location in which the solid desiccant lies in a pathway of air to be dehumidified and the second location in which the desiccant is generated; and heat exchange arrangement to cool the solid desiccant in the first location comprising a central heat exchange fluid inlet, a heat exchange fluid outlet, and at least one heat exchange fluid passageway from the inlet being arranged in heat exchange relationship with and separate to the air flow passageways, the heat exchange fluid passageway comprising at least one radial baffle forming part of the heat exchange passageway.

In yet a further embodiment, the present invention provides a solid desiccant cooling system comprising a desiccant wheel mounted for cyclic movement about a longitudinal axis of desiccant between a first location where solid desiccant contacts a source of air to be dehumidified and a second location where the solid desiccant is regenerated, the desiccant wheel comprising a plurality of air flow passageways containing desiccant oriented substantially parallel to the longitudinal axis moving between the first location in which the solid desiccant lies in a pathway of air to be dehumidified and the second location in which the desiccant is generated; and heat exchange arrangement to cool the solid desiccant in the first location comprising a central heat exchange fluid inlet, a heat exchange fluid outlet, and at least one heat exchange fluid passageway from the inlet being arranged in heat exchange relationship with and separate to the air flow passageways, the heat exchange fluid passageway comprising at least one radial baffle forming part of the heat exchange passageway.

The invention claimed is:

1. A solid desiccant cooling system, comprising:

a desiccant support structure adapted for cyclic movement of solid desiccant between a first location where solid desiccant contacts a source of air to be dehumidified and a second location where the solid desiccant is regenerated, and a heat exchange arrangement comprising a heat exchange fluid inlet, a heat exchange fluid outlet, and at least one passageway there between such that:

a heat exchange fluid flowing in said passageway is adapted to thermally engage said desiccant while remaining fluidly isolated therefrom, wherein said heat exchange arrangement is provided at said first location and wherein said heat exchange fluid is a liquid.

2. A solid desiccant cooling system of claim 1, wherein said heat exchange fluid is water, ethanol or glycol.

3. A solid desiccant cooling system of claim 1 wherein said desiccant support structure has a plurality of airflow passageways containing desiccant.

4. A solid desiccant cooling system as claimed claim 3 wherein the airflow passageways comprise a substantially mutually parallel array through the desiccant support structure.

5. A solid desiccant cooling system as claimed in claim 1 wherein the desiccant support structure has a cylindrical configuration mounted for rotation about a longitudinal axis.

6. A solid desiccant cooling system as claimed in claim 3 wherein the airflow passageways comprise compartments or conduits disposed radially from the longitudinal axis of said desiccant support structure.

7. A solid desiccant cooling system as claimed in claim 1 wherein the heat exchange fluid inlet is at or adjacent to the longitudinal axis of the desiccant support structure.

8. A solid desiccant cooling system as claimed in claim 7 wherein heat exchange fluid outlet is positioned radially outward of the heat exchange fluid inlet such that the heat exchange fluid flows radially outward from the inlet to the outlet.

9. A solid desiccant cooling system as claimed in claim 1 wherein a reservoir of heat exchange fluid is provided at the first location to immerse and cool said air flow passageways in said first location.

10. A solid desiccant cooling system as claimed in claim 7 wherein the heat exchange fluid outlet is located at or adjacent to the longitudinal axis of the desiccant support structure and spaced from the heat exchange fluid inlet.

11. A desiccant cooling system as claimed in claim 1 wherein the heat exchange passageways pass on the outside of the air flow passageways.

12. A desiccant cooling system as claimed in claim 1 wherein the desiccant containing structure is provided with at least one radial baffle forming part of the heat exchange passageway.

13. A desiccant cooling system of claim 12 wherein the at least one radial baffle defines a heat exchange fluid passageway which passes the heat exchanger fluid over the airflow passageways from the inlet and back to the outlet of the structure.

14. A desiccant cooling system of claim 9 wherein at least two radial baffles are provided in the desiccant support structure, to thereby provide an heat exchange passageway resulting in two or more passes of the heat exchange fluid over airflow passageways between the inlet and outlet.

15. A desiccant cooling system of claim 1, wherein the heat exchange fluid moves through the heat exchange passageways under the effects of gravity.

16. A desiccant cooling system as claimed in claim 1 wherein the heat exchange fluid moves under the effect of gravity and cyclic movement of the structure.

17. A method of operating a solid desiccant cooling cycle, comprising cyclically moving a mass of solid desiccant between a first location, in which the solid desiccant contacts a flow of air to dehumidify that air by adsorption of moisture to the desiccant, and a second location out of contact with said flow of air, whereby at said first location said solid desiccant is fluidly isolated but thermally engaged by a heat exchange fluid to cool said solid desiccant and wherein said heat exchange fluid is a liquid.

18. A method of operating a solid desiccant cooling cycle of claim 17 further including the step of regenerating the solid desiccant in the second location; by contacting the solid desiccant with a flow of a heated air.

19. A method of cooling solid desiccant in a solid cooling wheel according to claim 17 wherein the heat exchange fluid is supplied to a location provided at or adjacent a longitudinal axis of rotation of said solid desiccant wheel such that said fluid travels substantially radially through said first location.

20. The solid desiccant cooling system according to claim 1, wherein the desiccant dehumidifies the source of air.

* * * * *